United States Patent

Fredriksson

[11] 4,052,694
[45] Oct. 4, 1977

[54] METHOD AND APPARATUS FOR DIAGNOSING FAULTS IN THE GEOPHONE GROUP OF A GEOPHYSICAL DATA ACQUISITION SYSTEM

[75] Inventor: Oke A. Fredriksson, Fullerton, Calif.

[73] Assignee: Chevron Research Company, San Francisco, Calif.

[21] Appl. No.: 587,463

[22] Filed: June 16, 1975

[51] Int. Cl.² .................. G01V 1/16; G01C 27/00
[52] U.S. Cl. .................... 340/17 R; 324/51; 179/175.3 F
[58] Field of Search ............ 340/17; 324/51, 52, 324/62; 179/175.3 F

[56] References Cited

U.S. PATENT DOCUMENTS

| 3,541,436 | 11/1970 | Haggan | 324/62 R |
| 3,612,993 | 10/1971 | Tims et al. | 324/62 R |
| 3,651,399 | 3/1972 | Florance et al. | 324/62 |
| 3,717,810 | 2/1973 | Spanbauer | 324/57 R |

FOREIGN PATENT DOCUMENTS

| 1,299,355 | 7/1969 | Germany | 324/51 |

*Primary Examiner*—Nelson Moskowitz
*Attorney, Agent, or Firm*—R. L. Freeland, Jr.; H. D. Messner

[57] ABSTRACT

This invention relates to a method and apparatus for quick and convenient fault diagnosis of a geophone group-geophone cable complex of a geophysical data acquisition system used in the collection and recording of seismic information, such faults within each geophone group of such a system being identified, irrespective of the fact that a cable or cable segment is interconnected between the group under test and the fault-testing apparatus of the present invention.

10 Claims, 6 Drawing Figures

METHOD AND APPARATUS FOR DIAGNOSING FAULTS IN THE GEOPHONE GROUP OF A GEOPHYSICAL DATA ACQUISITION SYSTEM

FIELD OF THE INVENTION

The present invention pertains to the diagnosis of faults of elements or a combination of elements of a geophysical data acquisition system used in the collection or recording of seismic information, and more particularly to the testing of a group of geophones of such a system for faults while the group is connected to fault-testing equipment of the present invention through a geophone cable or cable segment.

BACKGROUND OF THE INVENTION

In seismic exploration, acoustic waves are generated at, or near, the surface of the earth and send downward into the earth. Reflections occur at the interfaces of subsurface strata whose acoustic impedances differ, and are subsequently detected by groups of geophones positioned at the earth's surface. Each geophone group (which can comprise a number of individual geophones) produces a composite electrical signal which drives indicating and recording equipment usually located in a recording truck, the equipment being electrically connected to the geophone group through a geophone cable or segment of a cable.

Whether the acquisition of the seismic data occurs in remote regions of the world or in more urban areas, performance standards relating to quantity as well as quality must be met.

As to the former, seismic crews for Chevron Oil Company, (Western Division), a subsidiary of Standard Oil Company, of California, habitually generate about two miles of conventional in-line, common depth point (CDP), 2400% stackable data per day per crew. Thus, any crew time that must be taken away from its active collection duties, as, e.g., in testing the geophone group or the geophones themselves for faults, must be kept to a minimum.

Also, it may be readily appreciated that the geophones of the geophysical data acquisition system must satisfy a very difficult set of quality requirements.

For example, new methods of processing field geophysical data are constantly being developed which attempt to extract more and more information contained in the acquired geophysical data. One such method which makes necessary the careful placement of the geophone and source arrays relative to each other is set forth and taught in U.S. Pat. No. 3,719,924 for "Anti-aliasing of Spatial Frequencies by Geophone and Source Placement," F. Muir et al, assigned to the assignee of the present application. In the above-mentioned patent, geophones in a group are placed in a selected configuration relative to each other (and a seismic source) whereby when their voltage output is combined, there is suppression of undesired interfering ("aliasing") energy. Assuming the geophone group included 36 geophones and each flyer included nine geophones each, all that is usually required is to connect the resulting four flyers in parallel in order to provide the desired suppression of the aliasing energy. Of course, the primary sensors of the data — the geophones — should also be uniformly sensitive in order to evenly detect waves which may have been significantly attenuated in their travel through many thousands of feet of earth.

A further requirement of geophones in field use is that they must be rugged to withstand rough handling, such as being dragged over rough terrain and being forcibly planted into the ground. Because even a single field truck may carry literally thousands of geophones, they also need to be physically small, but without sacrificing mechanical and electrical stability and required sensitivity to seismic energy.

OBJECT OF THE INVENTION

An object of the present invention is the provision of a novel diagnostic apparatus and method which can perform quick and convenient fault testing of groups of geophones of a geophysical data acquisition system in a manner which allows the field crew to determine — in minimum time — whether or not further testing is desirable on elements or combinations of elements within each geophone group, e.g., a particular flyer or selected geophones within a designated flyer.

SUMMARY OF THE INVENTION

In accordance with the present invention, faults within a geophone group-cable complex of a geophone data acquisition system can be quickly and easily indicated, irrespective of the fact that a geophone cable interconnects the geophone group under test and the fault-testing apparatus, by the steps of:

i. driving the geophone group-cable complex with (a) a direct current of predetermined but constant amplitude, and (b) a periodic sinusoidal current of the form $$I(t) = I(p) \sin 2\pi f t$$

where $I(p)$, the peak current is equal to the above-mentioned amplitude of the direct current, $f$ is frequency, preferably about equal to the geophone resonance frequency, and $t$ is time, ii. detecting excess of peak values of resulting input drive AC voltage with respect to the resulting DC voltage so as to provide a direct measurement of the difference in the AC and DC impedances of the geophone group; the effect of the resistance of the cable segment connected between the geophone group undergoing testing and the fault-testing apparatus of the present invention is compensated.

Since the apparatus of the present invention operates at a relatively low frequency, say 4.5 Hz to 14 Hz the AC and DC series impedances of the cable do not differ significantly in magnitude. Thus, if the driving peak alternating and direct currents are of constant and equal magnitude the detected difference in the AC and DC impedances ($\Delta Z$) of the geophone group can be indicated in a single easy measurement, and the magnitude of the difference can be used to determine such diverse conditions as: (i) disconnected or open geophone flyers, and (ii) open or improperly planted geophones within the geophone group undergoing testing without the need to individually measure the AC and DC impedances of the group-geophone complex.

Further objects, features and advantages of the present invention will become more apparent to those skilled in the art from a detailed reading of the following description of preferred embodiments thereof, when taken in consideration with the accompanying drawings.

DESCRIPTION OF PREFERRED EMBODIMENTS

Figure 1:
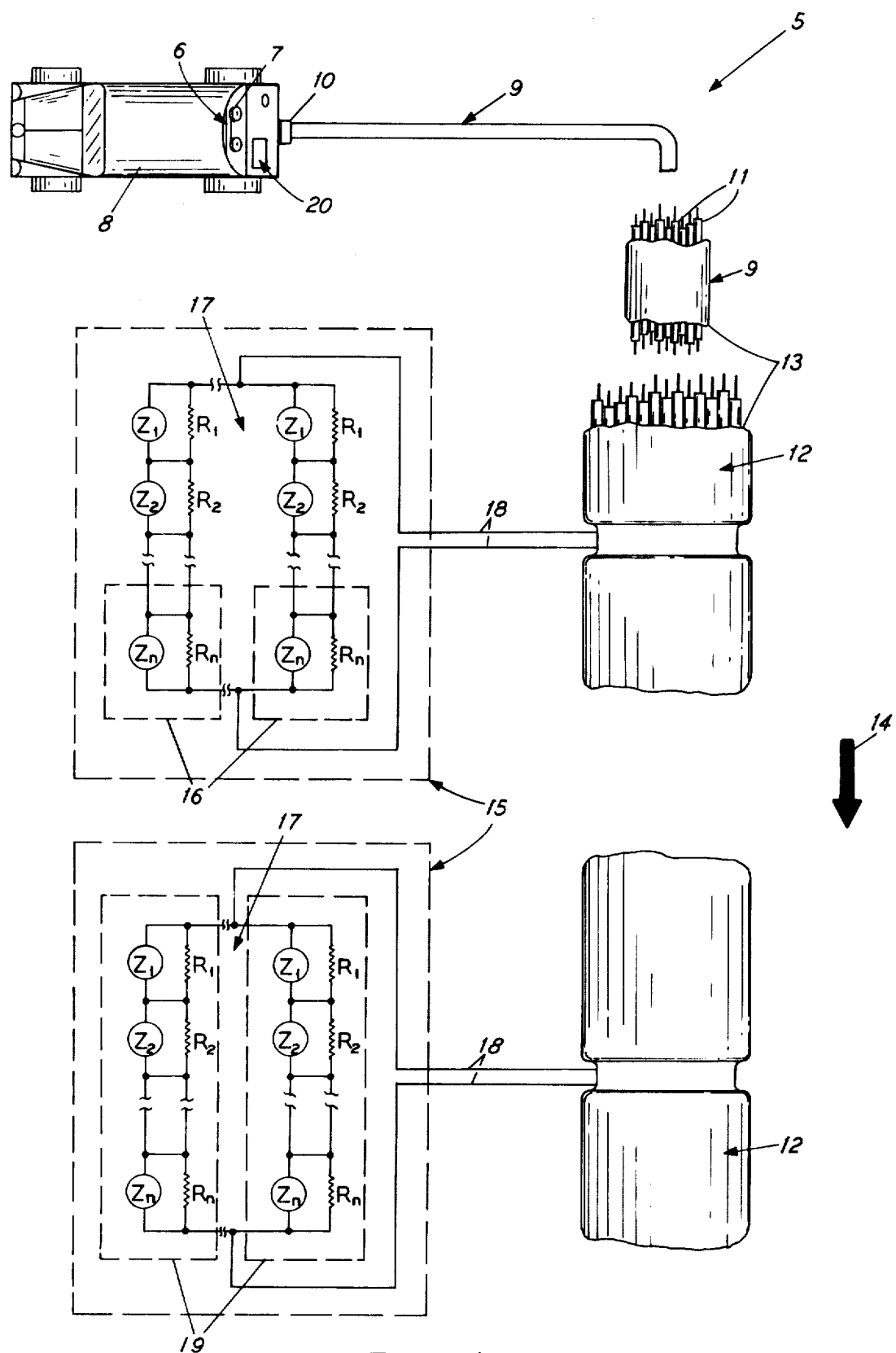
FIG. 1 is a plan view, partially schematic, of a geophone group of a geophone group-cable complex undergoing fault diagnosis using the apparatus and method of the present invention, such diagnosis occurring within a typical geophone group consisting of M flyers with each flyer in turn consisting of N individual geophones.

Reference should now be had to the drawings, particularly FIG. 1, illustrating geophysical data acquisition system 5 for use in collecting and recording geophysical data in the field.

Data acquisition system 5 includes amplification and recording equipment 6 (including tape reels 7) positioned within recording truck 8. Geophysical cable 9 is attached to truck 8. Interior of cable 9 are a series of pairs of cable conductors 11, which selectively connect to the amplification and recording equipment 6 via terminal 10.

Cable 9 is also seen to be divided, lengthwise, into a series of segments 12. The segments 12 are typically of equal length, say 400 feet; and adjacent segments are connected end-to-end at terminals (not shown) interior of housing 13 of cable 9. Result: an ultra-long geophone cable 9 is provided, say up to 15,000 feet in length, extendable over the earth's surface in a selected direction of survey 14 to which can be connected groups of geophones generally indicated at 15. In that way, responses of the plurality of geophone groups 15 (which can number up to 48 separate groups in many cases) to reflected acoustic waves can be individually indicated and recorded at truck 8.

A plurality of geophones 16 make up each geophone group 15. Such geophones 16 are usually arranged in a series parallel network 17. Purpose of each network 17: to combine the individual output of the geophones 16 to provide a single composite signal at output terminal conductors 18. Output terminal conductors 18, in turn, connect through a particular pair of cable conductors 11 of the cable 9 to truck 8 via terminal 10 so as to allow the signal generated by each network 17 to drive recording equipment 6.

Since terminal conductors 18 of each network 17 connect through a particular conductor pair within "a complex" of conductors comprising cable 9, the term "geophone group-cable complex" is often used to describe the field connection of an individual geophone group and associated cable conductors 11 to recording equipment 6 within recording truck 8; transfer of signal energy relative to the "complex" typically occurs at terminal 10 only.

Note that the phase responses of Z-1, Z-2 ... Z-n for each group 15 of FIG. 1 are functions of frequency. However, by driving the geophones of each group at their resonance frequency, as when testing for faults using test apparatus 20 of the present invention, variations due to changes in the imaginary part of the impedance are rendered inconsequential.

Figure 2:
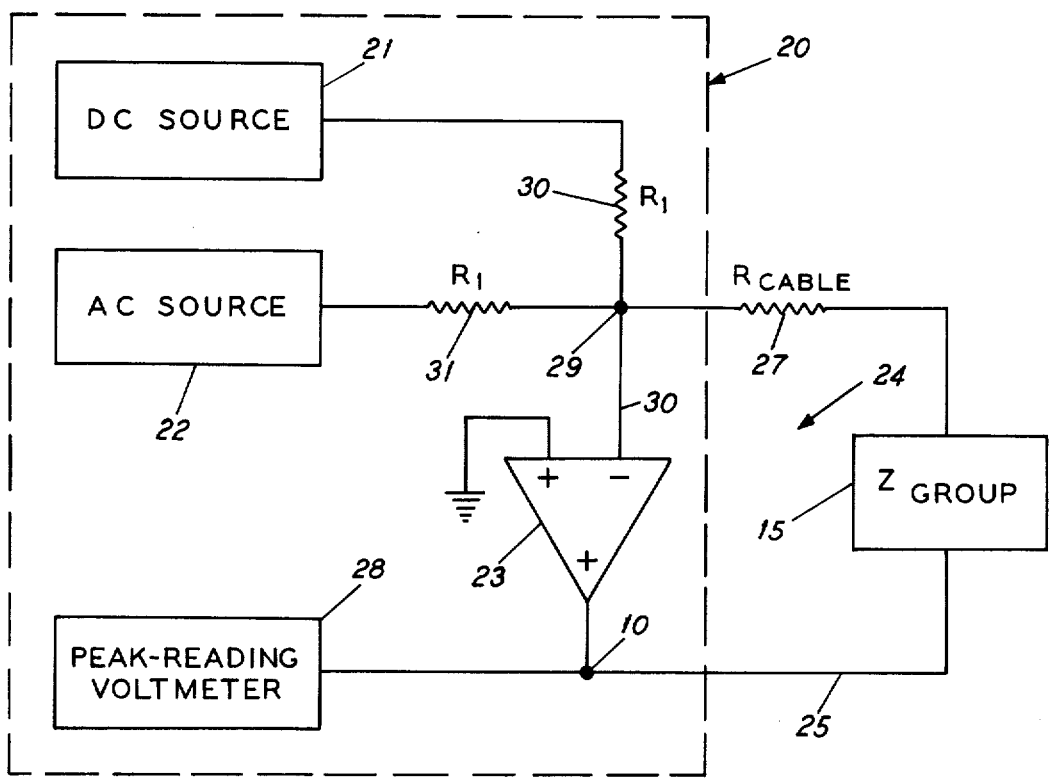
FIG. 2 is a schematic block diagram of the fault-testing apparatus of FIG. 1, for fault testing of the geophone group of FIG. 1, such apparatus being connected through a lumped cable resistance (Rc) to the geophone group undergoing testing, the latter being represented by a lumped electrical impedance Z.

FIG. 2 illustrates fault-testing apparatus 20 of the present invention in more detail.

As shown in FIG. 2, fault-testing apparatus 20 of the present invention is capable of carrying out diagnosis of faults of a geophone group 15 from a position remote from geophone group-cable complex 24, viz., within truck 8. It should be noted at this time that performance of each of geophone groups 15 of FIG. 1 is dependent, in the field, on the geophones comprising each group having impedance levels within a specified tolerance range. While it would appear that testing each geophone group in the field would be axiomatic, it is imperative that such testing be carried out quickly and efficiently so as to not unduly interrupt or burden field operations related to the actual collection of seismic data.

As shown, apparatus 20 provides for the efficient diagnosis of group faults and includes DC source 21. DC source 21 is connected in parallel with AC source 22 through resistors 30 and 31, respectively. Purpose of sources 21 and 22: to simultaneously drive (through operational amplifier 23) geophone group-cable complex 24 with AC and DC drive currents.

Operational amplifier 23 is conventional and is seen to be provided with a feedback loop 25. The loop 25 includes a lumped impedance Z (Zac and Zdc) associated with the geophone group 15, in series with a lumped cable resistance 27. Also serially connected to operational amplifier 23, but in parallel with the feedback loop 25, is voltmeter 28. The purpose of voltmeter 28: to indicate input-drive voltages at input terminal 10 due to the injection of the AC and DC drive currents into the complex 24, as explained in more detail below.

In order that the operation of the DC source 21 and AC voltage source 22 in conjunction with operational amplifier 23 produce independent drive currents simultaneously at input terminal 10, the former are used as voltage sources to feed resistors 30 and 31 connected to common node 29, in order to produce the desired sum current. To better appreciate such operation, a brief review of operational amplifiers in conjunction with voltage sources may be helpful and is presented below.

Recall from the theory of operation of operational amplifiers that: (i) the input of the operational amplifier has effectively infinite impedance; and (ii) amplification factors of such amplifiers are rather large (values up to the order of a million are conventional). Then with specific reference to FIG. 2, it follows from (i) and (ii) above that the magnitudes of the injected AC and DC current at input 10 are essentially equal to the sum current fed to common node 29 and independent of the lumped group impedance Z associated with geophone group 15 and the lumped cable resistance 27 in feedback loop 25. Moreover, if the voltages produced by sources 21 and 22 are equal and the resistors 30 and 31 are equal, so that the operational amplifier 23 generates equal peak AC and DC drive currents, then the resulting AC and DC peak voltages produced at input 10 are also proportional to the AC and DC impedances of the geophone group and the cable.

Assume the form of the AC drive current input at 10 is $$I(t) = I(p) \sin 2\pi ft$$

where $I(p)$ is peak current of $I(t)$, $f$ is frequency preferably equal to the resonance frequency of the geophones, and $t$ is time. Also assume the form of the DC drive current is such that its amplitude ($Idc$) is equal to the peak AC current, $I(p)$. The resulting AC peak voltage at the input 10, then, will be directly related to the AC impedance of the group, while the DC current biasing the AC peak voltage will be proportional to the DC impedance of the group.

Polarity of AC and DC drive currents are of importance. E.g., if the polarities of the AC and DC currents at input 10 are opposite, i.e., $I(p) = -Idc$, then only the positive excess of the peak AC voltage relative to the constant DC voltage at input 10 must be monitored. Thus, voltmeter 28 need only be a positive peak-reading voltmeter in order to indicate the differences between AC and DC impedance of the geophone group 15.

Figure 3A:
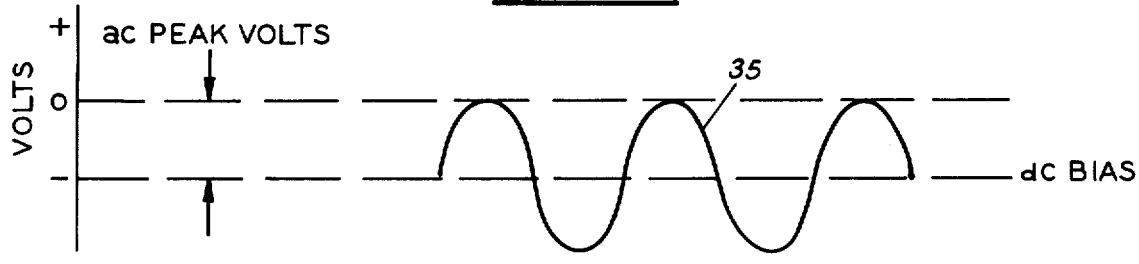
FIGS. 3A and 3B are voltage waveform diagrams resulting from simultaneous injection into the geophone group-cable complex of FIG. 1 of alternating and direct currents using the fault-testing apparatus of FIG. 1 and illustrating that differences in peak voltages of the associated AC and DC voltages are a direct measure of the difference in the AC and DC impedance of the geophone group of FIGS. 1 and 2 undergoing testing, independent of the magnitude of the resistance of the cable connected between the testing apparatus and that geophone group.
Figure 3B:
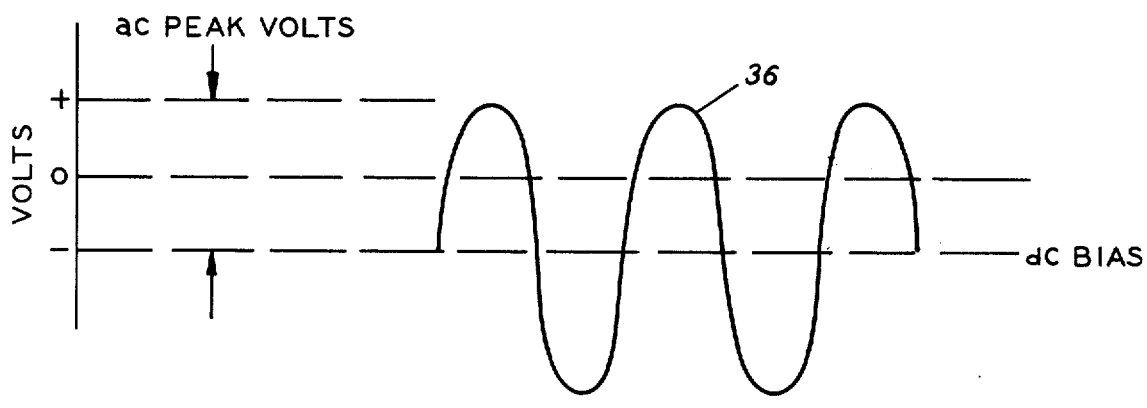

FIGS. 3A and 3B illustrate voltage waveforms produced at the input 10 of FIG. 2 during current injection.

Basically FIGS. 3A and 3B indicate how excess peak AC voltage relative to the DC generated voltage can be monitored to indicate differences in AC and DC impedances of the geophone group under test, such results being independent of cable resistance.

Now in detail, FIG. 3A presents a sum voltage trace 35. The trace 35 represents the voltage produced at input 10 of FIG. 2 as a function of time, say: (i) when DC source 21 produces a negative voltage exactly equal to the absolute peak voltage of AC source 22, and (ii) when the DC impedance of the geophone group under test is equal to its AC impedance.

As shown in FIG. 3A, sum voltage trace 35 is negative at all times; however, it is seen to rise to zero at one instant each period. Under such conditions, viz., AC and DC impedances of the groups being equal, the voltmeter 28 of FIG. 2 (assuming it is set to read only positive peaks) remains in an inactive state.

FIG. 3B represents the more probable case in which the AC impedance of the geophone group under test is greater than its DC impedance. Other conditions remain the same, that is, the DC source 21 is still producing a negative voltage exactly equal to the absolute peak voltage of AC source 22 and resistors 30 and 31 are still equal.

As shown in FIG. 3B, the resulting voltage trace 36 produced at the input of the complex rises above zero during one instant of each time period. Assuming the peak-reading voltmeter 28 of FIG. 2 is calibrated to read positive values, a finite positive voltage will then be indicated. Furthermore, since both the AC and DC back voltages are proportional to the respective AC and DC currents with which the are associated, multiplied by the respective AC and DC impedances that those currents encounter, it follows that the positive difference voltage measured by the peak-reading voltmeter 28 of FIG. 2 must be proportional to the difference between the AC and DC impedances of the geophone group 15 ($Zac$ and $Zdc$) independent of the cable resistance 27.

Figure 4:
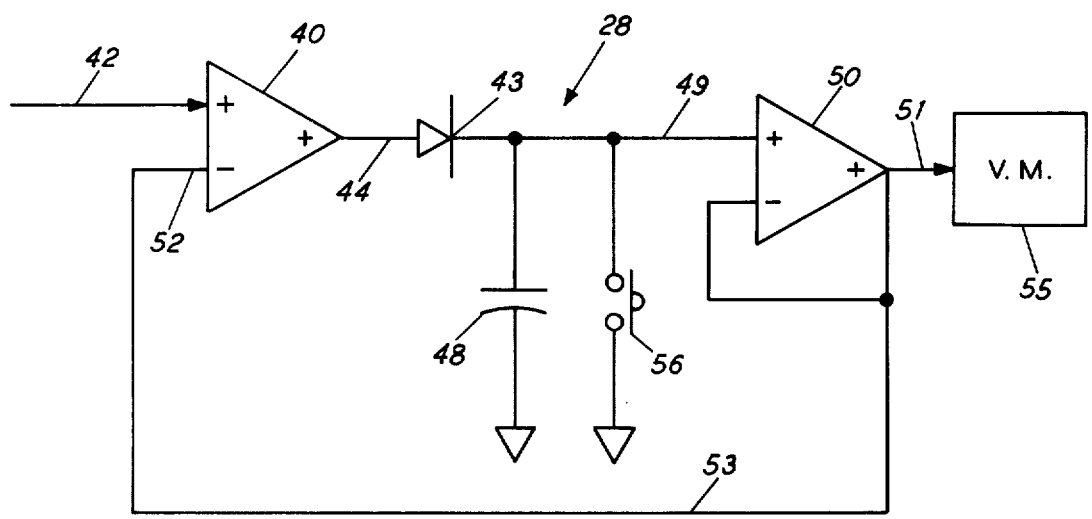
FIG. 4 is a detail of a peak-reading voltmeter of the fault-testing apparatus of FIG. 2.

FIG. 4 shows peak-reading voltmeter 28 of the fault-testing apparatus 20 of FIG. 2 in more detail.

As shown, the AC voltage to be measured by the voltmeter 28 is fed into an operational amplifier 40 at input 42. Rectifier 43 at output 44 of the operational amplifier 40 is provided with a very high back resistance. The effect of such resistance is to cause capacitator 48 in shunt with input 49 of operational amplifier 50 to be charged by positive current going toward capacitator 48 as long as the voltage at the input 42 of the operational amplifier 40 exceeds the voltage at input 52. Result: voltage on the capacitor 48 is applied to the input 49 of the operational amplifier 50 operating at unity voltage grain.

Input resistance at the input 49 of the operational amplifier 50 is effectively infinite, as previously explained, so that in the time periods concerned there is no significant drain of the charge on capacitor 48 by the operational amplifier 50. Output 51 of the amplifier 50 is seen to connect through feedback loop 53 to input 52 of the operational amplifier 40. Since the voltage gain of the amplifier 50 is unity, voltage at its output 51 (connected also to the negative input 52 of the operational amplifier 40 via feedback loop 53) must be equal to the voltage on capacitor 48. Voltage at the output 44 of the operational amplifier 40 is, of course, equal to a greatly amplified difference of the voltages at its inputs 42 and 52; thus, any drop in voltage at input 42 below whatever maximum positive value it had in the time period beginning with the charging of capacitor 48, (it being less in absolute value than the voltage on input 52) will cause the voltage at output 44 to be negative. Result: the capacitor 48 will receive no additional charge.

In that way, the charge on capacitor 48, and the associated voltage on capacitor 48, will represent, in accurate proportion, the highest previous voltage that has been applied to the input 42 of the operational amplifier 40 in the time period measured by the beginning of the charging of capacitor 48. Voltage on the capacitor 48 can be indicated, using whatever time is required, by voltmeter 55 at the output 51 of the operational amplifier 50.

While switch 56 is shown in FIG. 4 as if it were a simple pushbutton switch, it is preferably a clock-controlled or otherwise electronically controlled switch. Its purpose: to discharge the capacitor 48 at the output 44 of the operational amplifier 40 and start the peak-reading operation over again, for instance after the voltmeter 55 has had sufficient time to perform its indicating function.

Fault-test apparatus 20 of the present invention as illustrated in FIGS. 1-4, including peak-reading voltmeter 28, may be constructed using commercially available components, such as set forth below in Table I.

TABLE I

| Test Apparatus 20 | Manufacturer |
| --- | --- |
| DC current source 21 | Hewlett Packard 203A |
| AC current source 22 | Hewlett Packard 6227B |
| Operational amplifier 23 | Harris HA 2905 |
| Peak-Reading Voltmeter 28 | |
| Operational amplifiers 40,50 | Harris HA 2905 |
| Voltmeter 55 | Fluke 8300A |

The fault-testing apparatus 20 of Table I determines in a single measurement the difference between the AC and DC impedances of a multiplicity of geophone groups, in sequence, independent of the magnitude of the cable resistance connected between the test apparatus and the geophone group under test.

A comparison of fault-diagnostic characteristics of the fault-testing apparatus of Table I with those provided by conventional ohmmeter ($Zdc$) and AC impedance ($Zac$) testing techniques is set forth in Table II. The relevant geophone group of the theoretical group-cable complex under study includes 18 geophones arrange into three flyers, with each flyer containing six geophones in series.

Absolute and "normalized" results are indicated in Colums C-F of Table II under two conditions, viz., (i) where the group is remote from the test apparatus, viz. Rcable=2000 ohms, and (ii) where the group is directly connected to the test apparatus, Rcable=0 ohms. Note that Columns C and E tabulate impedance in ohms while Columns D and F "normalize" and compare results with respect to the "no-fault" case, i.e., case (a) of Column A.

there is a tendency to obscure the test results upon using the $Zdc$ and $Zac$ techniques. However, if the test technique in accordance with the present invention is used, $\Delta Z$, the DC impedance is subtracted from the AC impedance. Then, because the cable impedance is the same for the two cases, the difference impedance, $\Delta Z$, is as sensitive to changes "looking" through the cable as it would be if the cable were not there; that is to say, the $\Delta Z$ technique of the present invention is as sensitive as if the measurements were being made directly on the geophone group itself, as indicated by comparing Columns D and F of Table II.

For other types of faults, Columns D and F of Table II show that detection may be readily achieved if expectable variations within the groups are held to a tolerance of the order of 1%. Apparently it will still be very difficult to distinguish, say, one shorted geophone from one improperly planted geophone, and it will still be very difficult to detect, at all, one open geophone. However, those faults that can be detected and distinguished make the measurements worthwhile.

A practice already followed by some geophysical operators is that of carefully selecting geophones when

TABLE II

Impedances (AC and DC) of a geophone group, with and without the connecting cable. Group contains 3 flyers, each having 6 geophones.

| A | | B | C | D | E | F |
|---|---|---|---|---|---|---|
| Case | | Technique | Ohm Cable | % Variation of Column A | Cable | % Variation of Column A |
| a) | No fault in cable, geophones or geophone planting | $Zdc$ | 2674 | | 674 | |
| | | $Zac$ | 5000 | | 3000 | |
| | | $\Delta Z^*$ | 2326 | | 2326 | |
| b) | One disconnected, or open, flyer | $Zdc$ | 3011 | 13 | 1011 | 50 |
| | | $Zac$ | 6500 | 37 | 4500 | 50 |
| | | $\Delta Z^*$ | 3489 | 50 | 3489 | 50 |
| c) | One shorted geophone | $Zdc$ | 2632 | −1.6 | 632 | −6.2 |
| | | $Zac$ | 4813 | −3.7 | 2813 | −6.2 |
| | | $\Delta Z^*$ | 2181 | −6.2 | 2181 | −6.2 |
| d) | One improperly planted geophone, lying on its side | $Zdc$ | 2674 | 0 | 674 | 0 |
| | | $Zac$ | 4859 | −2.8 | 2859 | −4.7 |
| | | $\Delta Z^*$ | 2185 | −6.1 | 2185 | −6.1 |
| e) | One open geophone (bobbin) | $Zdc$ | 2832 | 5.9 | 832 | 23 |
| | | $Zac$ | 5150 | 3.0 | 3150 | 5.0 |
| | | $\Delta Z^*$ | 2318 | −0.3 | 2318 | −0.3 |
| f) | One open damping resistor | $Zdc$ | 2679 | 0.2 | 679 | 0.7 |
| | | $Zac$ | 5150 | 3.0 | 3150 | 5.0 |
| | | $\Delta Z^*$ | 2471 | 6.2 | 2471 | 6.2 |

*Fault-testing apparatus 20 of FIG. 2

Additional assumptions of interest: (i) each group-lumped impedance represents substantially pure resistance; (ii) each individual geophone is assumed to have an impedance of 380 ohms to direct current and 3000 ohms to alternating current (at the resonance frequency of the geophones); (iii) each damping resistor, $Rn$, is considered to have a value of 3000 ohms, and (iv) an improperly planted geophone lying on its side will exhibit an AC impedance substantially the same as its DC impedance.

Basically, Table II establishes the advantages of the test apparatus 20 of the present invention in diagnosing a plurality of faults within a distant geophone group of a group-cable complex. Note that Table II also indicates a negative result: that there are actually some faults which generate test data below the level of experimental error; such faults therefor cannot be confidently indicated until presently accepted geophone and flyer tolerances are more stringent.

It is also immediately apparent from Column D of Table II that a disconnected (or open) flyer [case (b)] causes a large percentage change in the impedance quantities $Zdc$, $Zac$ and $\Delta Z$ of Column B. But note that "looking" electrically through the cable (Column C), flyers are made up, so that even though the individual geophones vary in their measurable properties by several percent, the flyer properties are held to within a small tolerance, of the order of 1%. It is reasonable to expect tolerances in the future to decrease toward, and even below, the 1% level. So, although the percentage changes of Columns D and F of Table II are smaller than the expected variations in component properties in current field practice so that the corresponding faults might not be detectable with present equipment, they may become routinely detectable in the near future.

Furthermore, while the quantity $\Delta Z$ as provided by the fault-diagnostic technique of the present invention is a relatively sensitive indicator of the condition of the geophone group independent of the cable (therefore being a desirable quantity of the measure), the small percent of that change (Column D) that occur as a result of various faults in the geophone group, indicates that the greatest precision as is technically and economically possible under field limitations should be employed.

MODIFICATION

Figure 5:
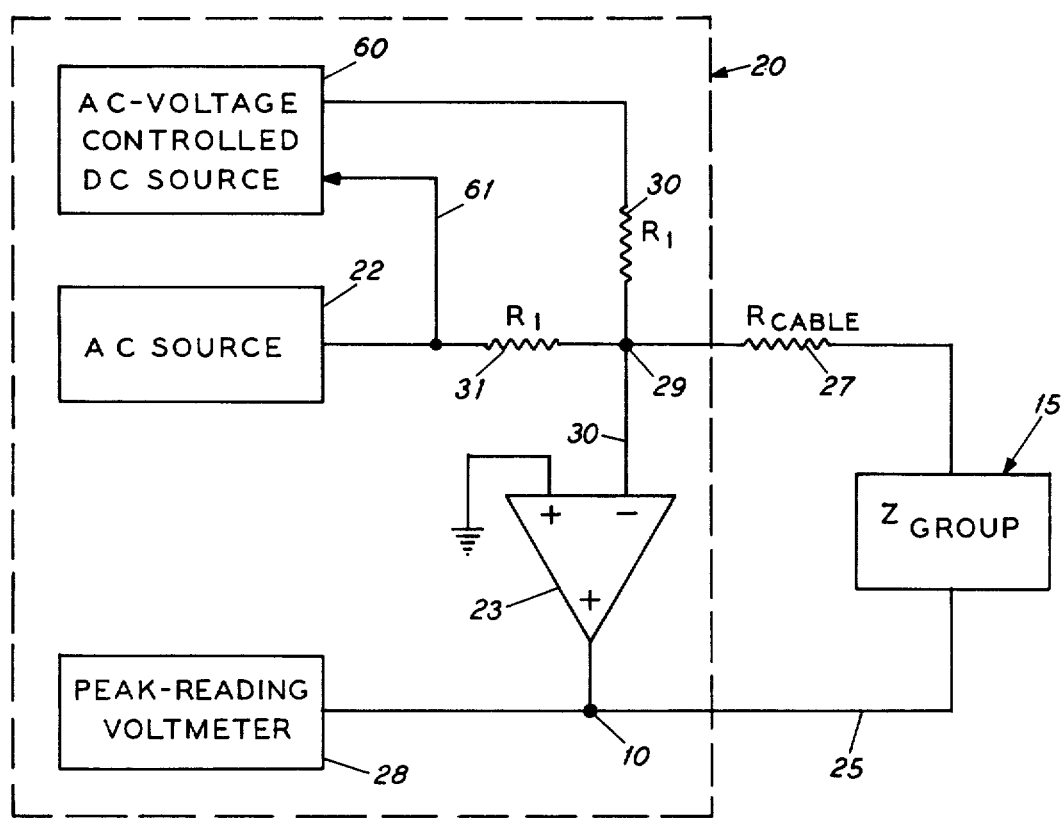
FIG. 5 is a block diagram illustrating an alternate form of the geophone-group testing apparatus of FIG. 2, such apparatus including a modified AC voltage control-DC source.

FIG. 5 shows an alternate arrangement of electronic components comprising the test apparatus 20 of the present invention. Purpose of the alternate embodiment: to provide the same over-all result as their arrangement of FIG. 2, but with several helpful modifications.

As shown, note that DC source 60 has been modified so it does not need as precise an independent control. Instead, the DC source 60 is connected in shunt with AC source 22. Result: control of the DC source 60 is provided by an AC signal from the AC source 22 entering DC source 60 via conductor 61. By means of that control signal, the DC voltage out of the DC source 60 is kept precisely equal to the peak AC voltage being generated by AC source 22.

FIG. 4 is useful in describing the operation of the AC-controlled DC source 60 of FIG. 5.

As shown, consider that voltmeter 55 has been erased from FIG. 4 and that the signal generated at the output 51 of the operational amplifier 50 as the final output of the circuit. It will be further appreciated that if a negative DC voltage is to be generated at output 51 of FIG. 4, it is necessary to change the sign of one of the voltages represented in FIG. 4. This may be done in several ways, for instance by reversing the rectifier 43 or by adding a third operational amplifier with unity negative gain.

Other positive equivalent arrangements will occur to those skilled in the art, and it is intended here to only indicate essential components useful in determining, in a single measurement, the difference between the AC and DC impedances of a geophone group of a group-cable complex, say by: (i) injecting into the complex being tested a DC current of predetermined amplitude; (ii) injecting simultaneously into the same complex an AC current of peak absolute amplitude equal to the amplitude of the DC current; (iii) detecting the voltage required to force the above-mentioned currents simultaneously through the complex; and (iv) determining the excess of the peak values of the resulting back AC and DC voltages.

While specific embodiments of the present invention have been hereinbefore described, it should be understood that the invention is not limited thereto, as many variations will be readily apparent to those skilled in the art and thus the invention is to be given the broadest possible interpretation within the terms of the following claims.

What is claimed is:

1. Apparatus for fault diagnosis of a geophone group within a geophone group-cable complex of a geophone data acquisition system which employs extensive series-parallel networks of geophones spread over the earth's surface and in which electrical signals from said groups must traverse along an extended geophone cable in order to be collected, detected and recorded, said apparatus looking electrically through said cable toward said group under test and yet compensating electrically for resistive effects of said cable to detect and possibly identify faults within said geophone group under test and among geophones within each group, comprising:
   a. means for injecting into an input of said group-cable complex a DC current of predetermined amplitude,
   b. means for injecting simultaneously into said input of said group-cable complex an AC current of peak absolute amplitude equal to said amplitude of said DC current, and
   c. means for detecting and measuring excess of (i) peak voltage produced by injection of said AC current, over (ii) DC voltage generated by injection of said DC current at said input of said group-cable complex, said excess being a measure of a difference between AC and DC impedances of said geophone group under test independent of said cable through which said DC and AC currents are driven.

2. Apparatus of claim 1 in which said means for injecting said DC current of predetermined amplitude includes a DC voltage source for generating a DC voltage, and an operational amplifier driven by said DC voltage for the generating of said DC current of predetermined amplitude at said group-cable complex.

3. Apparatus of claim 2 in which said operational amplifier has a feedback loop including said group-cable complex connected between input and output terminals thereof whereby said generated DC current of predetermined amplitude is made directly proportional to said generated DC voltage of said DC voltage source.

4. Apparatus of claim 1 in which said means for detecting excess of peak AC and DC voltages at said group-cable complex due to injection of said AC and DC current is a peak-reading voltmeter.

5. Apparatus for fault diagnosis of a geophone group within a geophone group-cable complex of a geophysical data acquisition system, comprising:
   means for driving said geophone group-cable complex with a DC current of predetermined amplitude (Idc);
   means for driving said same group-cable complex with an AC current of absolute peak amplitude (Ip) equal to said amplitude of said DC current;
   means for detecting and measuring excess of resulting input AC voltage with respect to DC voltage at said complex so as to provide a direct measurement of the difference of AC and DC impedance of said geophone group.

6. The apparatus of claim 5 in which said AC drive current to said group-cable complex is of the form $$I(t) = I(p) \sin 2\pi ft$$

wherein $I(p)$ is AC peak current, $f$ is frequency in Hz, $t$ is time, and where $I(p) = Idc$ at said complex.

7. Apparatus of claim 6 in which said frequency ($f$) is about equal to the resonance frequency of geophones comprising said group.

8. Method for diagnosing faults of a geophone group within a geophone group-cable complex of a geophysical data acquisition system, comprising the steps of:
   i. simultaneously driving said geophone group-cable complex with direct current of predetermined constant amplitude (Idc) and alternating current of peak amplitude (Ip) equal to said amplitude of said direct current, and
   ii. detecting the excess of the peak value of the resulting AC voltage with respect to the constant value of the resulting DC voltage across the terminals of said complex so as to provide a direct measurement of the difference in the AC and DC impedances of the geophone group of said geophone group-cable complex.

9. Method of claim 8 in which said AC current is of the form $I(t) = I(p) \sin 2\pi ft$, where $I(p)$ is AC peak current, $f$ is frequency, $t$ is time, and,
   in which $I(p)$ is related to said direct current driving said complex in accordance with $I(p) = -Idc$.

10. Method of claim 8 in which $f$ is about equal to the geophone resonance frequency.

* * * * *